United States Patent
Jones et al.

(10) Patent No.: US 9,953,388 B2
(45) Date of Patent: Apr. 24, 2018

(54) SYSTEMS AND METHODS OF MONITORING THE UNLOADING AND LOADING OF DELIVERY VEHICLES

(71) Applicant: Wal-Mart Stores, Inc., Bentonville, AR (US)

(72) Inventors: Nicholaus A. Jones, Fayetteville, AR (US); Robert J. Taylor, Rogers, AR (US); Matthew A. Jones, Bentonville, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 15/366,201

(22) Filed: Dec. 1, 2016

(65) Prior Publication Data
US 2017/0186124 A1    Jun. 29, 2017

Related U.S. Application Data

(60) Provisional application No. 62/261,993, filed on Dec. 2, 2015.

(51) Int. Cl.
*G06Q 50/28* (2012.01)
*G10L 25/51* (2013.01)
(Continued)

(52) U.S. Cl.
CPC ....... *G06Q 50/28* (2013.01); *G06Q 10/06311* (2013.01); *G10L 25/51* (2013.01); *G08B 21/182* (2013.01)

(58) Field of Classification Search
CPC ....... H04N 21/44222; H04N 21/44218; H04N 21/44213; H04N 21/8352;
(Continued)

(56) References Cited

U.S. PATENT DOCUMENTS

| 4,576,274 A | 3/1986 | Thorsen |
| 4,868,544 A | 9/1989 | Havens |

(Continued)

OTHER PUBLICATIONS

PCT; App. No. PCT/US2016/063974; International Search Report and Written Opinion dated Feb. 3, 2017.
(Continued)

*Primary Examiner* — Mohammad Islam
(74) *Attorney, Agent, or Firm* — Fitch, Even, Tabin & Flannery LLP

(57) ABSTRACT

In some embodiments, provide apparatuses and methods to estimate unload states. Some of these embodiments include system to monitor unloading of product delivery vehicles, comprising: an audio detector; an audio evaluation circuit configured to: receive the audio signals captured by the audio detector; and identify when the audio signal includes one or more audio signatures corresponding to one or more distinct predefined audio signatures that correspond to movements of products relative to unloading products; and a control circuit coupled with the audio evaluation circuit and configured to estimate at a given time a state of unloading of a load of products intended for the shopping facility as a function of the identifying that one or more of the audio signals include one or more audio signatures corresponding to the one or more predefined audio signatures that correspond to movements of products relative to unloading.

16 Claims, 2 Drawing Sheets

(51) Int. Cl.
*G06Q 10/06* (2012.01)
*G08B 21/18* (2006.01)

(58) Field of Classification Search
CPC ......... H04N 21/25866; H04H 2201/90; H04H 60/58; H04H 60/31; H04H 60/52; H04H 60/45; H04H 60/35; H04H 20/31; H04H 60/56; H04H 60/63
See application file for complete search history.

(56) References Cited

U.S. PATENT DOCUMENTS

| | | |
|---|---|---|
| 5,119,087 A | 6/1992 | Lucas |
| 5,283,550 A | 2/1994 | MacIntyre |
| 5,526,433 A | 6/1996 | Zakarauskas |
| 5,834,706 A | 11/1998 | Christ |
| 6,026,686 A | 2/2000 | Hattori |
| 6,206,165 B1 | 3/2001 | Lenander |
| 6,378,684 B1 | 4/2002 | Cox |
| 6,486,768 B1 | 11/2002 | French |
| 6,867,694 B2 | 3/2005 | Wieth |
| 7,579,967 B2 | 8/2009 | Wieth |
| 7,746,379 B2 | 6/2010 | Jesson |
| 8,046,160 B2 | 10/2011 | Carter |
| 8,188,863 B2 | 5/2012 | Rinkes |
| 8,406,993 B2 | 3/2013 | Hannah |
| 8,433,507 B2 | 4/2013 | Hannah |
| 8,477,032 B2 | 7/2013 | Bergman |
| 9,104,205 B1 | 8/2015 | Caver |
| 2002/0167403 A1 | 11/2002 | Colmenarez |
| 2004/0193466 A1 | 9/2004 | Kull |
| 2006/0103530 A1 | 5/2006 | Prather |
| 2007/0282716 A1 | 12/2007 | Branigan |
| 2008/0136623 A1 | 6/2008 | Calvarese |
| 2010/0176922 A1 | 7/2010 | Schwab |
| 2013/0233922 A1 | 9/2013 | Schoening |
| 2013/0290018 A1* | 10/2013 | Anderson ............... G06Q 10/10 705/2 |
| 2014/0035726 A1* | 2/2014 | Schoner ............. G06K 7/10366 340/8.1 |
| 2014/0167960 A1* | 6/2014 | Argue .................. B07C 5/3422 340/540 |
| 2015/0046229 A1* | 2/2015 | Gollu ............... G06Q 10/06393 705/7.39 |
| 2016/0292933 A1* | 10/2016 | Sprock ................... G07C 5/008 |
| 2017/0162215 A1 | 6/2017 | Jones |
| 2017/0180925 A1* | 6/2017 | Taylor ..................... H04W 4/02 |

OTHER PUBLICATIONS

PCT; App. No. PCT/US2016/064120; International Search Report and Written Opinion dated Feb. 17, 2017.

U.S. Appl. No. 15/364,881; Office Action dated Sep. 15, 2017; (pp. 1-21).

\* cited by examiner

SYSTEMS AND METHODS OF MONITORING THE UNLOADING AND LOADING OF DELIVERY VEHICLES

CROSS-REFERENCE TO RELATED APPLICATION

This application claims the benefit of U.S. Provisional Application No. 62/261,993, filed Dec. 2, 2015, which is incorporated herein by reference in its entirety.

TECHNICAL FIELD

This invention relates generally to monitoring product unloading and/or loading of delivery vehicles.

BACKGROUND

In modern retail environments, there is a need to improve the customer experience. Part of the customer experience is maintaining product on the shelves and a desired on shelf availability. The distribution of product to the sales floor can have an effect on the on shelf availability. Providing a pleasant or improved customer experience can lead to customer satisfaction and repeat returns to the shopping location.

There are many ways to improve customer experience. For example, ready access to products and convenience to collecting products can lead to increased customer visits and customer loyalty. The shopping facility can affect customer experience based in part on finding products of interest. Accordingly, it can be advantageous to improve the customers' shopping experience.

BRIEF DESCRIPTION OF THE DRAWINGS

Disclosed herein are embodiments of systems, apparatuses and methods to track the unloading and/or loading of products. This description includes drawings, wherein.

Figure 1:
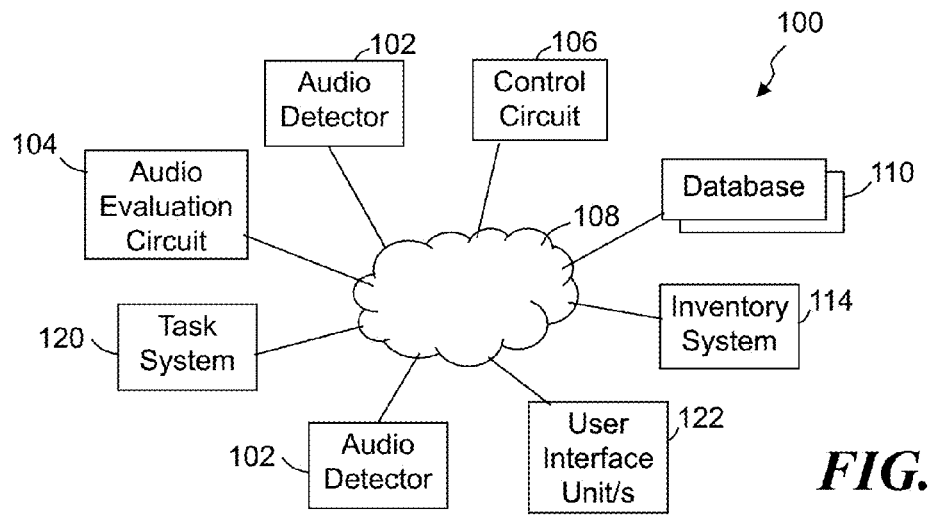
FIG. 1 illustrates a simplified block diagram of an exemplary product delivery, unloading and/or loading monitoring system to monitor the unloading and/or loading of product delivery vehicles, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses, methods and processes are provided to monitor the unloading and/or loading of products. Some embodiments at least in part monitor the unloading of products from product delivery vehicles at a shopping facility. One or more audio detectors are positioned relative to an unloading bay at a shopping facility. The audio detectors capture audio signals generated at and/or around the unloading bay. One or more audio evaluation circuits are communicatively coupled with the audio detectors to receive, over time, the audio signals captured by the audio detector. The audio evaluation circuits identify, for each of the audio signals, when a detected audio signal includes one or more audio signatures that correspond to one or more distinct predefined audio signatures that correspond to movements of products relative to unloading products from a product delivery vehicle at the unloading bay. One or more control circuits communicatively couple with the audio evaluation circuit and estimate at a given time a state of unloading of a load of products intended for the shopping facility as a function of identifying that one or more of the audio signals include one or more audio signatures corresponding to the one or more predefined audio signatures that correspond to movements of products relative to unloading.

Typically, in unloading delivery vehicles at a shopping facility, it is often unknown how many cases and/or packaging of products have been unloaded from a delivery vehicle outside of a start time and stop time, and/or determine a number of cases and/or packaging of products remaining on a delivery vehicle. Similarly, it is often difficult to determine productivity of workers during an unloading process. Some embodiments, however, provide an accurate measure of product removal, state of unloading and/or worker productivity, which can improve unloading, stocking, On Shelf Availability (OSA), and the like. Similarly, some embodiments provide the monitoring of a loading process, track a state of loading, and/or can monitor worker productivity during loading.

FIG. 1 illustrates a simplified block diagram of an exemplary product delivery, unloading and/or loading monitoring system 100 to monitor the unloading and/or loading of product delivery vehicles, in accordance with some embodiments. The system includes one or more audio detectors 102, one or more audio evaluation circuits and/or systems 104, and a central or unload monitoring control circuit 106 that is communicatively coupled with at least the audio evaluation circuit 104 and typically further communicatively coupled with the audio detector 102 through one or more wired and/or wireless distributed communication networks 108 (e.g., LAN, WAN, Internet, etc.). The system typically further includes one or more databases 110 and/or other electronic data storage components, which may store predefined and/or prerecorded audio signatures, product shipment and/or load information, cases and/or packaging counts, delivery vehicle identifiers, delivery load identifiers, inventory information, product information, and/or other such information. In some embodiments, the system may optionally include and/or communicatively couple with one or more inventory systems 114, one or more task systems 120, user interface units 122 and other relevant systems. It is noted that at least the control circuit 106 and the audio evaluation circuit 104 are illustrated as separate circuits. However, in some embodiments some or all of the audio evaluation circuit 104 may be implemented in the control circuit 106. Similarly, some or all of the functionality of one or more of the task system 120, and inventory system 114 can be cooperated and implemented into one or more systems, and in some instances some or all of the functionality may be as part of the control circuit 106.

Figure 2:
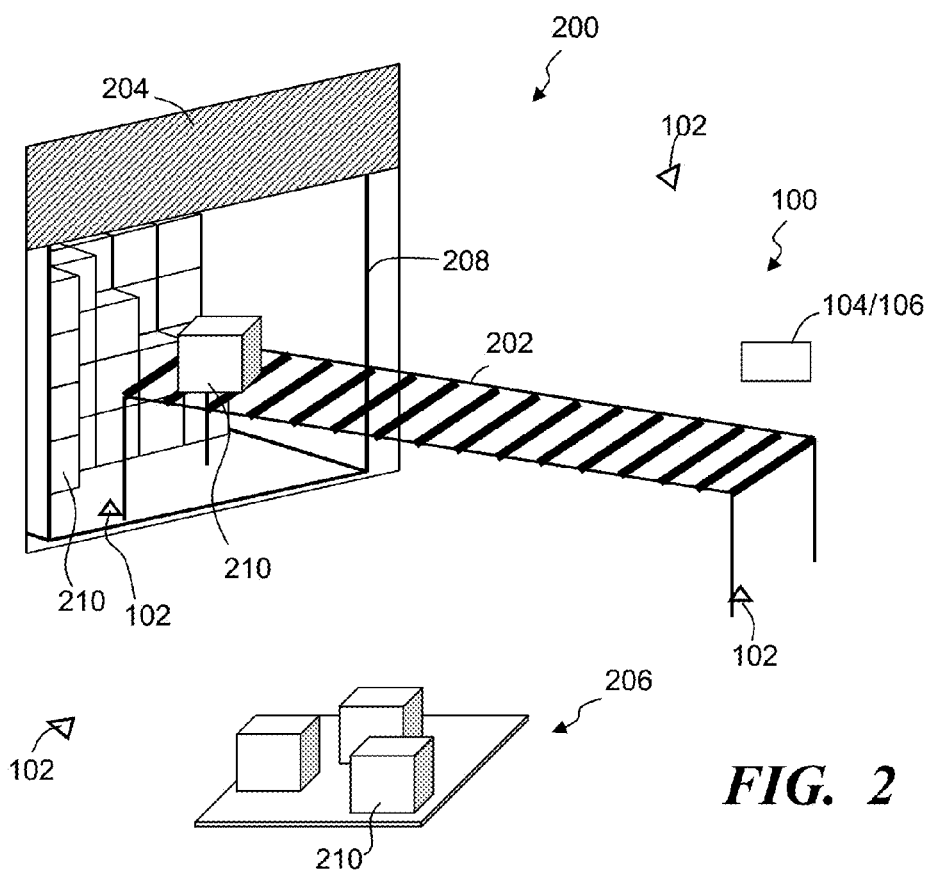
FIG. 2 illustrates a simplified block diagram of an exemplary loading/unloading bay and an unload/load monitoring system, in accordance with some embodiments.

FIG. 2 illustrates a simplified block diagram of an exemplary loading/unloading bay 200 and an unload/load monitoring system 100, in accordance with some embodiments. The below is described with reference to monitoring the unloading of products 210 from one or more delivery vehicles 208 at a shopping facility. It will be appreciated by those skilled in the art that similar monitoring can be performed during the loading of delivery vehicles at a distribution center, shopping facility, and the like. Similarly, the monitoring is not limited to tracking product packaging, but can track pallets of products or other such collection of products, and/or individual products when individually loaded and unloaded.

Referring to FIGS. 1-2, the one or more audio detectors 102 are positioned to detect audio signals relative to the unloading bay 200, one or more unloading/loading equipment and/or product transport apparatuses and/or systems 202, from one or more staging areas, and/or other such of predefined locations. For example, an audio detector 102 may be positioned adjacent an unloading dock or bay door 204, adjacent and/or fixed to the product transport apparatus 202, proximate one or more predefined locations, staging locations and/or areas 206, other such locations or combination of two or more of such locations. Additionally or alternatively, an audio detector may be positioned remote from locations or area where audio signals are to be detected and directed to capture audio signals from those locations. For example, one or more audio detectors 102 may be positioned on walls and/or celling and directed to capture the audio signals generated at or around the unloading bay 200, staging areas 206, product transport apparatus 202, and the like. As a further example, one or more audio detectors may include one or more directional microphones and/or antennas mounted at a distance from the unloading bay and directed at the unloading bay to capture at least some of the audio signals generated relative to the delivery vehicle 208 when parked at the unloading bay. The one or more control circuits 106 and one or more audio evaluation circuits 104 are in communication with each other. Further, the audio detectors 102 are in wired and/or wireless communication with the audio evaluation circuit and/or control circuit.

In some applications, the one or more audio detectors can include one or more microphones, parabolic microphones, directional microphones, antennas, other such audio detectors, or combination of two or more of such detectors. For example, one or more audio detectors may include an array of multiple microphones positioned to detect audio signals generated at or proximate the unloading bay 200 of the shopping facility. The audio detectors can be mounted adjacent bay doors 204, on product transport apparatuses or systems 202, and other such locations. As introduced above, in some applications, one or more audio detectors 102 may include a directional microphone or antenna mounted at a distance from the unload bay and/or staging areas 206, and directed at unload bay, a staging area or other area to capture at least some of the audio signals generated during the unloading and/or loading of the delivery vehicle. In some instances, one or more parabolic microphone can be positioned on a wall, celling and/or other such locations, and be directed at an unloading bay 200, bay door 204, staging areas 206, etc.

The use of the directional antennas limits the detected sound that is evaluated. In some applications, the audio detectors may include one or more filters and/or are configured to detect sounds within limited frequency ranges to further limit the scope and/or quantity of sounds considered. Some embodiments use multiple microphones placed at different locations. The cooperative use of multiple audio detectors allows the audio evaluation circuit and/or control circuit to identify and/or estimate a location where the audio signal is detected. For example, triangulation can be used when two or more audio detectors detect the same audio signal. Sounds can be used to triangulate the location based on a number of microphones capturing the sounds. For example, microphones can be directed at multiple different locations and capturing sounds at the multiple locations. The different microphones could capture the sound at different times, and thus be used to determine a location where the sound occurred. Audio detectors may further capture audio signals generated by one or more noise makers on product transport apparatuses 202, product packaging, cases of products, pallets, and the like. Further, the noise makers may allow identification and/or distinction of different unload equipment, pallets and the like (e.g., unique sounds and/or combination of sounds). A power source can be included in the noise maker, rechargeable power source, or the like.

In many instances, multiple different areas of and/or proximate one or more unloading bays 200 and/or staging areas may be of interest. Some embodiments may use one or more audio detectors that are configured to detect audio signals from multiple of these areas. Additionally or alternatively, some embodiments may use one or more audio detectors to detect audio signals from a single area. In some applications, the audio detectors may continuously capture audio, may capture audio based on a schedule or pattern, in response to a notification that a delivery is expected and/or has arrived, and/or activated in response to one or more triggers. For example, one or more audio detectors may periodically be activated (e.g., once a second) to capture one or more sound signal that can be evaluated. The evaluation may trigger one or more additional audio detectors. In some embodiments, a worker may activate the one or more audio detectors (e.g., by pushing a button, by opening a bay door, or the like). One or more audio detectors may additionally or alternatively capture limited sounds, such as above a determined volume threshold, have a component within one or more given frequency ranges, and/or the like. Similarly, the detection and/or recording of the audio signals can continue for a predefined period of time in response to a signal being within the frequency ranges and/or above a threshold volume, until an audio signal drops below a threshold volume, interference and/or distortion exceeds a threshold, and/or other such factors.

The one or more audio evaluation circuits 104 are communicatively coupled with one or more of the audio detectors, and receive over time the audio signals captured by the one or more audio detectors. The audio signals are processed and/or evaluated to identify, for each of the audio signals, when the audio signal includes one or more audio signatures corresponding to one or more distinct predefined audio signatures that correspond to movements of products relative to unloading products from a product delivery vehicle 208 at the unloading bay 200 and/or staging areas. The processing can include filtering, band limiting, amplification, analog to digital conversion, transforming (e.g., Fourier transforms), other such processing, or a combination of two or more of such processing.

The evaluation in some embodiments can include determining whether an audio signature of a detected and/or recorded audio signal has a frequency range and/or a spectral content that is within thresholds of one or more predefined frequency ranges in determining whether one or more products, product packaging, cases of product, etc. have been removed from or placed into the delivery vehicle, whether a product, case of product, etc. has been placed at one of the one or more predefined locations, whether unloading equipment has been positioned relative to a bay door and/or delivery vehicle, whether the unloading equipment has been partially or fully moved into a delivery vehicle, and other such predefined audio signatures. In some embodiments, for example, one or more types of Fourier transforms and/or other such transforms may be applied to a detected audio signal and frequency ranges of one or more peaks may be identified, and/or a series of frequency ranges may be identified as a frequency signature corresponding to an audio signal with one or more sounds, and typically a sequence of sounds. The one or more frequency ranges and/or frequency signatures of the one or more audio signals can be compared to one or more predefined frequency ranges, sequence of ranges, and/or frequency signatures in evaluating the audio signature to determine whether a detected audio signal corresponds to predefined audio signal (e.g., within a threshold frequency range of the predefined audio signal).

The predefined audio signatures may be one or more predefined frequency bands, frequency ranges or the like. In some implementations, the predefined audio signatures can be captured at known times when inducing known sounds, such as moving unloading equipment through a bay door 204, moving unloading equipment into a delivery vehicle 208, a pallet jack being moved to a staging area, packaging, case or cases of products being moved along product transport apparatus, a pallet jack moving away from a staging area, a pallet jack moving from a back area and toward a sales floor area, a door in the unloading bay and/or a back storage area being opened, a door of a delivery vehicle being opened, one or more bells or other predefined noise makers that are activated in response to unloading equipment being moved and/or positioned, other such predefined audio signatures, combinations of such audio signatures, and/or sequences of two or more of such audio signatures. The predefined audio signals can be similarly processed to obtain the predefined frequency signatures, predefined frequency ranges and the like.

One or more threshold variations from the predefined frequency signatures and/or frequency ranges can further be defined such that detected signatures that are within the threshold of the frequency signatures and/or ranges are typically also considered to correspond to the predefined audio signals. A frequency and/or frequency range can be determined for a predefined audio signal and/or of a distinct sound. In some embodiments, audio signals that include one or more sounds within a threshold can be considered a match to the predefined sounds with some distortion. The distortion can be caused by various different affects, such as but not limited to weather, dirt build-up (e.g., dirt may lower the frequency and making the signal have more bass), changes in physical characteristics (e.g., damage to unloading equipment causing generated sound to move in the treble direction), degradation over time, damage to wheels and/or bearings, and other such effects. Accordingly, embodiments typically evaluate the detected audio signatures in determining whether the detected audio signatures and/or portions of audio signatures are within threshold variations of predefined audio signatures. Additionally or alternatively, detected audio signatures can be evaluated relative to known prerecorded audio signatures that correspond to sounds generated in preparing to and while unloading or loading delivery vehicles (e.g., delivery bay doors opening or closing, product transport apparatuses being moved and/or positioned, products being placed at one or more locations, movements of products along a product transport apparatus, and the like).

The control circuit 106 couples with the audio evaluation circuit 104 and receives the output of the evaluation of the audio signals. In some instances, the audio evaluation circuit notifies the control circuit when a match is detected between a detected audio signal and a predefined audio signature. The match can indicate, for example, that a bay door is opened, that unloading equipment is being positioned within the delivery vehicle, that one or more product packaging, cases, pallets, etc. are being staged at one of one or more staging areas, that a pallet jacks, dollies or the like is being moved through a back area and/or toward a sales floor (e.g., an area of the floor may include a series of bumps, depressions or the like that induce a sequence of sounds that can be detected, with the sequence identifying a direction of movement), and/or other such conditions.

The control circuit in part estimates at a given time a state of unloading of a load of products intended for the shopping facility, a state of loading, movements of products from a back storage area, and the like, as a function of the identifying that one or more of the audio signals include one or more audio signatures corresponding to the one or more predefined audio signatures. For example, the control circuit in part may estimate the state and/or status of unloading of a load of products as a function of identifying that one or more of the audio signals include one or more audio signatures corresponding to the one or more predefined audio signatures that correspond to movements of products relative to unloading. The control circuit and/or another control system may further utilize this quantity information. In some embodiments, for example, the control circuit can estimate a number of cases, pallets, products or the like that have been removed from a delivery vehicle. Based on the estimated state of unloading, the control circuit can for example determine when and/or whether one or more workers should be tasked to assist in the unloading, one or more workers should be reassigned away from the unloading, one or more works may be tasks with retrieving and moving cases, one or more workers may be tasks with restocking the sales floor, and the like. In some embodiments, the control circuit identifies that the estimated state of unloading of the load is greater than a threshold state. Based on this state, the control circuit in some applications may notify one or more workers of the shopping facility to initiate movement of one or more products unloaded from the product delivery vehicle 208 to a sales floor of the shopping facility in response to the estimated state of unloading being determined to be greater than the threshold state.

In some embodiments, the control circuit can communicate a task message to one or more user interface units 122 (e.g., smart phones, tablets, optical head-mounted display systems, smart watch systems, shopping facility specific wireless communication devices, scanning devices, and other such consumer electronic user devices), a notification can be displayed on one or more work displays of work terminals and/or POS systems, printed to paper, and/or other such notification. Workers may additionally acknowledge the task is completed (e.g., through a user interface unit, pressing a predefined button, etc.).

Additionally or alternatively, the notification can be directed to the task system 120. The task system can evaluate tasks currently assigned to one or more workers and identify one or more workers of the plurality of workers at the shopping facility and/or scheduled to be at the shopping facility that should be assigned the one or more tasks (e.g., moving cases to the sales floor, additional workers to unload the delivery vehicle, etc.). Again, notification can be a wireless communication to a user interface unit 122, displayed on a display that is visible to workers, and/or other such notifications.

Some embodiments further identify that one or more audio signatures of one or more audio signals correspond to one or more products being placed in one of one or more staging areas 206. The control circuit can further determine a location of the one of the one or more staging areas in which the one or more products were placed as a function of detecting the audio signature. The notification to one or more workers can include directing one or more workers to the determined location. Further, in some applications, audio signatures can be evaluated to confirm that workers have performed one or more assigned tasks.

As introduced above, some embodiments estimating a state and/or status of unload based on how far into the delivery vehicle a product transport apparatus has been moved and/or is moved into the delivery vehicle. Transport apparatuses can include conveyor systems, pallet jacks, dollies, and other such systems and apparatuses to transport products. In some embodiments, one or more audio evaluation circuits 104 can further identify that each of a sequence of multiple audio signatures correspond to one or more predefined audio signatures corresponding to successive and progressive movements of a product transport apparatus being moved into the product delivery vehicle. For example, a flexible and/or expandable roller conveyor system may be moved further into the delivery vehicle 208 and cases of product continue to be moved out of the delivery vehicle. Sound signals can be detected based on the expansion and/or movement of some or all of the roller conveyor system is moved into the delivery vehicle. Similarly, the wheels of a pallet jack and/or dollie being pushed into the delivery vehicle can be detected and tracked (e.g., wheels contacting a series of groove, joints, bumps or the like in the floor of the delivery vehicle). The control circuit can estimate a distance into the product delivery vehicle that the product transport apparatus has been moved as a function of the multiple audio signatures corresponding to the predefined audio signatures corresponding to the progressive movements of the product transport apparatus being moved into the product delivery vehicle. The control circuit can estimate the state of unloading as a function of the estimated distance into the product delivery vehicle the product transport apparatus has been moved, that is the further into the delivery vehicle over time corresponds to the number of cases, pallets, packages and the like that have been removed from the delivery vehicle.

Further, some embodiments estimate the state of unload based on a number of detected cases, packages, products or the like being moved along a conveyor system, moved by a pallet jack, moved by a dollies, or the like. The audio evaluation circuit 104, in evaluating the audio signals, may further identify that each of multiple sequences of audio signatures correspond to one or more sequences of predefined audio signatures corresponding to a product packaging, cases, pallets, or the like being moved relative to a product transport apparatus as the product packaging is removed from the product delivery vehicle. The control circuit can estimate a number of product packagings that have been removed from the product delivery vehicle as a function of a number of the multiple sequences of audio signatures that correspond to the one or more sequences of predefined audio signatures corresponding to a product packaging being moved relative to the product transport apparatus. The estimated state of unloading can be determined as a function of the number of product packagings that have been removed from the product delivery vehicle.

In some embodiments, the tracking of the unloading and/or loading process may be initiated in response to a trigger. The trigger may be a worker activating the process, an audio signal may include an audio signatures that corresponds to a predefined audio signature, may be based on a schedule, may be based on an estimated time of delivery, in response a delivery vehicle traveling over one or more sensors and/or contacting a button or surface of the unloading bay, and/or other such triggers. For example, the unload/load monitoring system 100 may be activated to initiate tracking the unloading based on detected audio signature corresponding to a door opening. The detected opening may also be considered in relation to one or more other factors, such as a detection of a presence of a delivery vehicle, a scheduled delivery, and/or other such information. In some applications, the control circuit identifies that one or more audio signatures detected in one or more captured audio signals correspond to one or more predefined audio signatures of a door relative to an unloading bay being opened. The door may be a bay door 204, a retractable door of a delivery vehicle, a delivery and/or employee door, and other such doors. The control circuit and/or the audio evaluation system may be initiated to track the unloading of the product delivery vehicle in response to the identifying that the one or more audio signatures correspond to the one or more predefined audio signatures of a delivery door being opened.

The control circuit, in some implementations, may further determine an efficiency of unloading a delivery vehicle. The rate of unload may be identified based on a load log, number of packaging, cases, pallets, etc. removed, historical rates and/or durations of unloading, other such factors, or combination of two or more of such factors. in some embodiments, the control circuit determines an efficiency of unloading based on a current time relative to a time of detecting the audio signal containing the audio signature corresponding to the predefined audio signature of the delivery door being opened. Additionally, the inventory system 114 may provide information regarding the number of product packaging, cases and the like that are to be removed from the delivery vehicle. The control circuit may use this information in estimating the state of unloading. The state of unloading and/or time to remove products can be considered based on one or more thresholds, historical times of unloading, and/or other such information. The efficiency information can be provided to one or more workers to track performance, identify potential teams of workers that are more or less efficient than expected, identify shopping facilities that have problems with unloading, determine alternative unloading techniques, and/or other such considerations.

In some embodiments, the control circuit further distinguishes a first location (e.g., first unload bay, first staging area, etc.) from one or more other different predefined locations (e.g., second unload bay, second staging area, etc.) based on the detected sound. Accordingly, the control circuit 106 may track the unloading of a delivery vehicle at a first unload bay, based on a first set of the one or more audio signatures that are determined to correspond to one or more predefined audio signatures that are associated with the first unload bay, are detected by one or more audio detectors associated with the first unload bay, are triangulated to correspond to the first unload bay, and the like. Similarly, the control circuit can distinguish unloading taking place at a first unload bay from a simultaneous unloading taking place at a second unload bay. Further, the control circuit can separately estimate given states of unloading at the first and second unload bays. Further, the estimations may be based on separate sets of one or more audio signatures corresponding to separate sets of one or more predefined audio signatures that associated with the different unload bays (e.g., a second set of one or more predefined audio signatures associated with a second unload bay, a third set of one or more predefined audio signatures associated with a third unload bay, etc.), the sets of one or more audio signatures being detected from sets of one or more audio detectors associated with the different predefined locations, and the like. The control circuit may additionally or alternatively evaluate estimated states of unload at one or more unload bays relative to respective thresholds corresponding to unload bays, groups of workers, type of products being unloaded, size of the load being unloaded, state of OSA, and/or other such factors. As such, the control circuit in causing one or more workers to be notified and/or setting one or more tasks to be performed may further cause the one or more workers to be notified and/or tasked to a particular unload bay, a particular staging area, or otherwise specifically directed.

Some embodiments determine and/or confirm an unload bay where unloading is occurring, staging area, and/or determine a state of unloading based on a combination of multiple audio signatures. The audio evaluation circuit 104, in some applications, may identify that multiple detected audio signatures each correspond to a different predefined audio signature. The control circuit and/or audio evaluation circuit may further evaluate the detected audio signatures and identify that the multiple audio signatures occurred within a threshold period of time and/or the multiple detected audio signatures occurred in a sequence consistent with a predefined sequence of predefined audio signatures. In some instances, when the multiple detected audio signatures that correspond to multiple predefined audio signatures occurred within the threshold period of time of each other and/or occurred in accordance with the predefined sequence, the control circuit may designate that the unloading is occurring at a first of multiple unload bays, a depth within the delivery vehicle that a product transport apparatus is moved, that product unloading has started, that product unloading has completed, product is placed at a first of multiple staging areas, that products are moved from a back storage area, or other such designation that corresponds to one of multiple different sequences of predefined audio signatures. The sequence of detected audio signatures can further be used to determine a direction of movement of the products.

In some embodiments, one or more predefined audio signatures may correspond to a product transport apparatus container contacting one or more predefined structures and/or elements at the predefined locations, and thus generating one or more known audio signatures. For example, a set of one or more predefined audio signatures may correspond to wheels sequentially contacting a ramp, moving between a ramp and a delivery vehicle, a conveyor system being opened or extended, products being moved along the conveyor, other such contact with one or more other structures, or combination of such predefined signatures corresponding to contact with structures. Further, different structures at different locations (e.g., different unload bays, different staging areas, etc.) may be configured to generate different sounds and/or sounds at different pitches resulting in different audio signatures. As such, the audio evaluation circuit and/or control circuit can distinguish between the different structures, actions and/or locations based on the different audio signatures.

Some embodiments may further modify and/or updating predefined audio signatures over time. For example, the sounds generated in response to a particular product transport apparatus and/or type of product transport apparatus being moved into position relative to a delivery vehicle at a particular pay may change over time, based on dents, bends, wear, rust, and the like. As such, the audio evaluation circuit and/or control circuit may track over time changes in one or more detected audio signatures relative to one or more predefined signatures that the audio evaluation circuit and/or the control circuit associate with a first unloading bay, first staging area, etc. Based on the detected change over time, the predefined audio signature may be modified and/or one or more additional predefined audio signatures may be added to the set of one or more predefined audio signatures that correspond to the corresponding predefined location. In some embodiments, the control circuit identifies when a threshold number of detected audio signatures that are associated with a first unload bay, staging area or the like have a threshold similarity to each other and/or consistent difference relative to a predefined audio signature corresponding to the unload bay, stating area, etc., the control circuit may modify and/or add one or more predefined audio signatures. Similarly, the detection of audio signatures over a threshold period of time and have the determined consistent difference to the first predefined audio signature and/or the detected audio signatures have a threshold consistency over that threshold period of time, the control circuit and/or audio evaluation circuit may modify and/or update the one or more corresponding predefined audio signatures.

In some embodiments, the control circuit may further utilize evaluated audio signals to confirm that one or more workers have performed an unloading task, performed or started to perform a restocking task, moved products from a back storage area, or other such task. The audio evaluation circuit may further receive one or more additional audio signals captured by one or more audio detectors after one or more workers are notified to perform a task (e.g., unload a delivery vehicle, move products to a sales floor, etc.). The audio evaluation circuit can identify, from the additional audio signal, one or more additional audio signatures corresponding to one or more predefined additional audio signatures that correspond to movements of packaged products being moved. For example, the additional audio signals may include a series of audio signatures may be identified as corresponding to a series of audio signatures of a pallet jack moving a pallet of products from a first staging area and through a set of doors toward the sales floor. Again, the movement of the products can include audio signatures with predefined frequency ranges, a sequence of audio signatures with predefined frequency ranges, audio signatures that are similar to prerecorded audio signatures, audio signatures with predefined frequency ranges and that over time increase and/or decrease in volume as the products are moved toward or away from one or more audio detectors, and the like.

Figure 3:
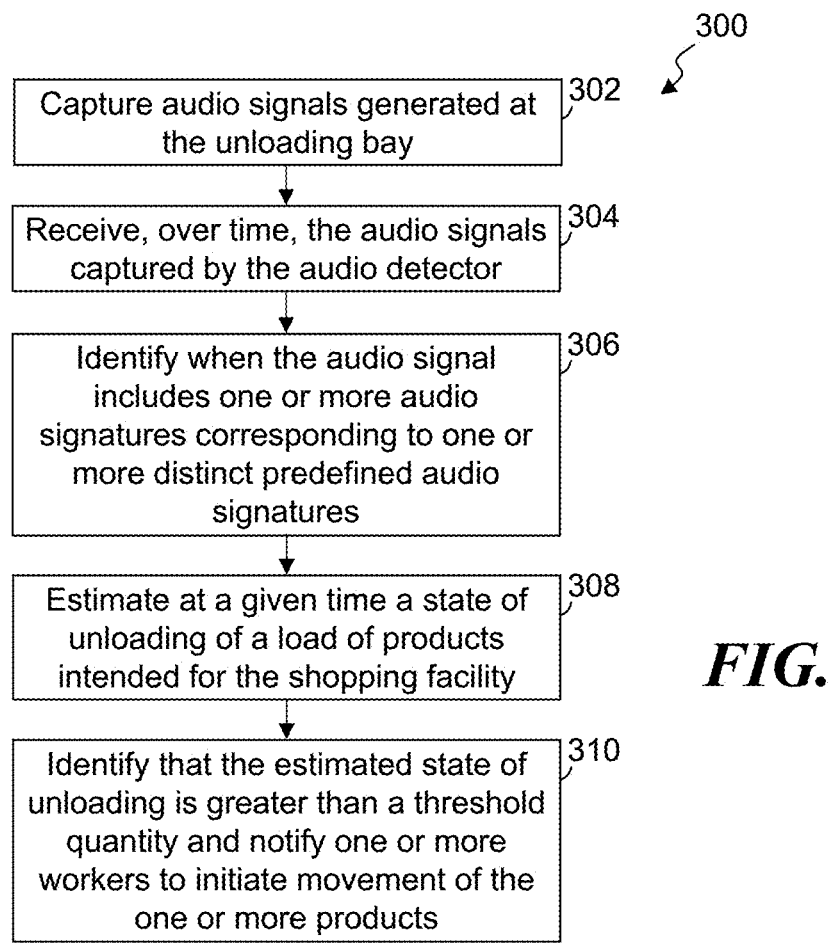
FIG. 3 illustrates a simplified flow diagram of an exemplary process of monitoring and/or tracking an unloading or loading of a delivery vehicle, in accordance with some embodiments.

FIG. 3 illustrates a simplified flow diagram of an exemplary process 300 of monitoring and/or tracking an unloading or loading of a delivery vehicle, in accordance with some embodiments. In step 302, one or more audio detectors 102, positioned relative to an unloading bay at a shopping facility, capture audio signals generated at the unloading bay. The audio detectors may be positioned at an unload bay, on unload equipment, remote from the unload bay, or combination thereof. Some embodiments utilize multiple audio detectors to capture audio signals at one unload bay.

In step 304, audio signals captured by the audio detector are received over time through one or more audio evaluation circuits 104. In step 306, each of the audio signals is evaluated to identify when one or more audio signals includes one or more audio signatures corresponding to one or more distinct predefined audio signatures that correspond to movements of products relative to unloading products from a product delivery vehicle at the unloading bay.

In step 308, a state of unloading of a load of products intended for the shopping facility is estimated as a function of identifying that one or more of the audio signals include one or more audio signatures corresponding to the one or more predefined audio signatures that correspond to movements of products relative to unloading. Some embodiments may further include step 310 where it is identified that the estimated state of unloading of the load is greater than a threshold state, and one or more workers of the shopping facility are notified to initiate movement of one or more products unloaded from the product delivery vehicle to a sales floor of the shopping facility in response to the estimated state of unloading being greater than a threshold state. For example, a threshold of half of a truck load may be set and when it is determined that the state of unloading is greater than or equal the threshold, one or more workers may be notified. The notification can be through the task system 120 or directly from the control circuit. As another example, one or more threshold amounts of time may be specified to reach corresponding one or more predefined states of unloading (e.g., an first threshold amount of time to reach at least a quarter of a load unloaded, a second threshold amount of time to meet half of a loud unloaded, and/or other such thresholds). In those instances where an estimated state of unloading may notify one or more additional workers to help with the unloading to speed up the unloading process. Similarly, one or more threshold periods of time may correspond with rates of unloading and one or more additional workers may be notified to help and/or one or more workers may be pulled from the unloading depending on the determined estimated state of unload relative to the one or more thresholds.

Some embodiments, further identify that each of a sequence of multiple audio signatures correspond to one or more predefined audio signatures corresponding to successive and progressive movements of a product transport apparatus 202 being moved into the product delivery vehicle. The control circuit can estimate a distance into the product delivery vehicle that the product transport apparatus has been moved as a function of the multiple audio signatures corresponding to the predefined audio signatures corresponding to the progressive movements of the product transport apparatus being moved into the product delivery vehicle. The estimate state of unloading can be determined as a function of the estimated distance into the product delivery vehicle the product transport apparatus has been moved. For example, it may be estimated that the product transport apparatus 202 is initially positioned two feet into the delivery vehicle when the unloading was initiated. The load for the shopping facility is known, including the quantity of products, and typically a depth into the delivery vehicle the load extends. Based on detected audio signals over time, the control circuit can track the movement of the product transport apparatus extending further into the delivery vehicle. The depth at which the product transport apparatus is placed relative to the known and/or expected depth of the load can be used to estimate the state of unloading. Additionally or alternatively, some embodiments estimating a state of unload based on a number of detected packagings, cases, products, pallets, etc. being removed from the delivery vehicle (e.g., along a conveyor and/or moved by pallet jack. The audio evaluation circuit can identify that each of multiple sequences of audio signatures correspond to one or more sequences of predefined audio signatures corresponding to a product packaging being moved relative to a product transport apparatus as the product packaging is removed from the product delivery vehicle. The control circuit can then estimate a number of product packagings that have been removed from the product delivery vehicle as a function of a number of the multiple sequences of audio signatures that correspond to the one or more sequences of predefined audio signatures corresponding to a product packaging being moved relative to the product transport apparatus. Using this information, the control circuit can estimate the state of unloading as a function of the number of product packagings that have been removed from the product delivery vehicle.

Further, some embodiments track a placement of unloaded products and direct workforce to relevant products from the identified place where the unloaded products are placed. It can be identified that one or more audio signatures of one or more audio signals corresponds to one or more products being placed in or at one of one or more staging areas. A location of the one of the one or more staging areas in which the one or more products were placed can be determined as a function of detecting the one or more audio signatures. In notifying one or more workers, the one or more workers can be directed to the determined location.

Some embodiments further initiate tracking the unloading based on trigger, such as detecting door sound, a button being pushed, detecting a delivery vehicle at an unload bay, or other such trigger or combination of two or more of such triggers. For example, some embodiments identify that one or more audio signatures detected in one or more audio signals of captured audio signals corresponds to one or more predefined audio signatures of a delivery door relative to the unloading bay being opened. Tracking of the unloading of the product delivery vehicle can be initiated in response to identifying that the one or more audio signatures correspond to the one or more predefined audio signatures of the delivery door being opened. The determined state of unloading can be used to track unloading, issue tasks to workers, evaluate workers and other such functions. For example, some embodiments determine an efficiency of unloading based on a current time relative to a time of detecting one or more audio signals that contain one or more audio signatures corresponding to one or more predefined audio signatures of the delivery door being opened.

As described above, the audio detectors 102 can be positioned at predefined locations (e.g., adjacent a bay door 204), adjacent a loading dock, on a product transport apparatus 202, at staging areas and the like. Additionally or alternatively, one or more audio detectors can be mounted separated by a distance from the area where audio is being detected. For example, some embodiments mount one or more directional microphones and/or antennas at distances from one or more unloading bays and are direct at the one or more unloading bay. The one or more directional microphones can capture at least some of the audio signals generated relative to one or more delivery vehicles when parked at the one or more unloading bays.

Figure 4:
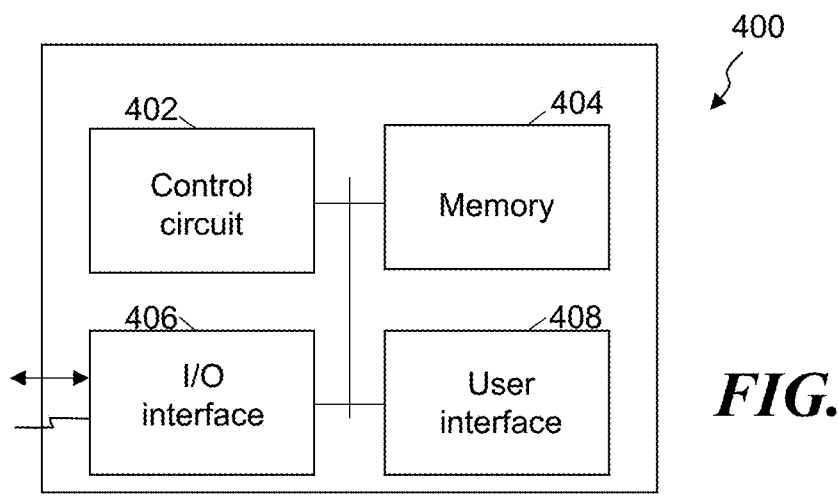
FIG. 4 illustrates an exemplary system for use in implementing systems, apparatuses, devices, methods, techniques and the like in monitoring the unloading and/or loading of a delivery of products in accordance with some embodiments.

The methods, techniques, systems, devices, services, servers, sources and the like described herein may be utilized, implemented and/or run on many different types of devices and/or systems. Referring to FIG. 4, there is illustrated an exemplary system 400 that may be used for any such implementations, in accordance with some embodiments. One or more components of the system 400 may be used to implement any system, apparatus or device mentioned above or below, or parts of such systems, apparatuses or devices, such as for example any of the above or below mentioned audio detectors 102, audio evaluation circuits 104, control circuit 106, inventory system 114, task system 120, user interface units 122, and the like. However, the use of the system 400 or any portion thereof is certainly not required.

By way of example, the system 400 may include one or more system control circuits 402, memory 404, and input/output (I/O) interfaces and/or devices 406. Some embodiments further include one or more user interfaces 408. The system control circuit 402 typically comprises one or more processors and/or microprocessors. The memory 404 stores the operational code or set of instructions that is executed by the system control circuit 402 and/or processor to implement the functionality of the audio detectors 102, audio evaluation circuits 104, control circuit 106, inventory system 114, task system 120, user interface units 122, and the like. In some embodiments, the memory 404 may also store some or all of particular data that may be needed to detect audio signals, evaluate the audio signals, distinguish locations, estimate unloading states, and make any of the detections, associations, determinations, measurements and/or communications described herein. Such data may be pre-stored in the memory, received from an external source, be determined, and/or communicated to the system.

It is understood that the system control circuit 402 and/or processor may be implemented as one or more processor devices as are well known in the art. Similarly, the memory 404 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 404 is shown as internal to the system 400; however, the memory 404 can be internal, external or a combination of internal and external memory. Additionally, the system typically includes a power supply (not shown), which may be rechargeable, and/or it may receive power from an external source. While FIG. 4 illustrates the various components being coupled together via a bus, it is understood that the various components may actually be coupled to the system control circuit 402 and/or one or more other components directly.

Generally, the system control circuit 402 and/or electronic components of the system 400 can comprise fixed-purpose hard-wired platforms or can comprise a partially or wholly programmable platform. These architectural options are well known and understood in the art and require no further description here. The system and/or system control circuit 402 can be configured (for example, by using corresponding programming as will be well understood by those skilled in the art) to carry out one or more of the steps, actions, and/or functions described herein. In some implementations, the system control circuit 402 and the memory 404 may be integrated together, such as in a microcontroller, application specification integrated circuit, field programmable gate array or other such device, or may be separate devices coupled together.

The I/O interface 406 allows wired and/or wireless communication coupling of the system 400 to external components and/or or systems. Typically, the I/O interface 406 provides wired and/or wireless communication (e.g., Wi-Fi, Bluetooth, cellular, RF, and/or other such wireless communication), and may include any known wired and/or wireless interfacing device, circuit and/or connecting device, such as but not limited to one or more transmitter, receiver, transceiver, etc.

The user interface 408 may be used for user input and/or output display. For example, the user interface 408 may include any known input devices, such one or more buttons, knobs, selectors, switches, keys, touch input surfaces, audio input, and/or displays, etc. Additionally, the user interface 408 include one or more output display devices, such as lights, visual indicators, display screens, etc. to convey information to a user, such as but not limited to a state of unloading, load identifier information, staging area location information, modification information related to the modification and/or addition of predefined audio signatures, status information, notifications, errors, conditions, and/or other such information. Similarly, the user interface 408 in some embodiments may include audio systems that can receive audio commands or requests verbally issued by a user, and/or output audio content, alerts and the like.

Some embodiments further include one or more microphones, arrays of microphones, and the like. Still further, some embodiments may include sensors and/or sensor systems, such as but not limited to inertial detection systems, signal strength detection systems, movement detectors, optical sensors, bar code readers, and the like.

Present embodiments, in part, provide a systematic approach to tracking and/or monitoring unloading of delivery vehicles. Some embodiments can further identify problems associated with unloading, track unloading efficiencies, and/or notify one or more workers to perform additional unloading, and/or implement other tasks associated with unloading. Some embodiments include one or more audio detectors (e.g., microphone, microphone array, etc.) that can be placed at predefined locations and/or away from predefined locations relative to one or more unloading bays 200. The audio detectors and/or sensor are communicatively coupled to an unload monitoring control circuit 106 or server, that uses input from an audio evaluation circuit 104 to monitor and evaluate unloading based on detected audio signals and audio signatures in those signals.

Some embodiments provide one or more sound sensors and/or audio detectors 102 that can be placed in an unload area relative to one or more unloading bays 200. The unload/load monitoring system 100 detect distinct sounds and/or audio signatures. Some embodiments capture predefined audio signal and/or signatures of known audio (e.g., sound of a box being placed on rollers of a roller conveyor system and being pushed, the sound of stretching and contracting the roller conveyor system, the sound of an unloading bay door 204 being opening, the sound of a pallet jack, the sound of a door opening and/or closing, and the sound of product cases being placed on and/or hitting pallets or rocket carts). Audio signatures and/or frequency spectrum signatures can be determined from these known audio signals that can be used to populate a library and/or database of predefined audio signatures that are associated with the source of the signature. Based on these signatures the unload/load monitoring system 100 can estimate a state of unloading, determine a number of cases being unloaded, identify when and what cases are causing delays, and/or other such aspects of unloading. This data is leveraged to improve the process (e.g., identify a group of workers that are inefficient, identify products and/or types of products and/or types of packaging that slow down the unloading, identifying how to distribute unloaded products, organization of staging areas, and the like). Typically, a load history and/or log identifies the order of product and the order the truck was loaded. This information can be used to estimate and/or identify which product packaging, cases, pallets and the like as they are unloaded and/or to determine which cases, products, packaging are causing trouble. Further, the state of unloading and/or efficiency of unloading can be provided to management of the shopping facility and/or a headquarters. Some embodiments may additionally or alternatively cause one or more task notices, alerts and the like to be generated (e.g., notice sent to management to stock priority items).

In some embodiments, systems, apparatuses and methods to monitor the unloading and/or loading of products. Some embodiments, provide systems to monitor unloading of product delivery vehicles, comprising: an audio detector positioned relative to an unloading bay at a shopping facility and configured to capture audio signals generated at the unloading bay; an audio evaluation circuit configured to: receive, over time, the audio signals captured by the audio detector; and identify, for each of the audio signals, when the audio signal includes one or more audio signatures corresponding to one or more distinct predefined audio signatures that correspond to movements of products relative to unloading products from a product delivery vehicle at the unloading bay; and a control circuit coupled with the audio evaluation circuit and configured to estimate at a given time a state of unloading of a load of products intended for the shopping facility as a function of the identifying that one or more of the audio signals include one or more audio signatures corresponding to the one or more predefined audio signatures that correspond to movements of products relative to unloading.

Some embodiments provide methods of monitor unloading of product delivery vehicles, comprising: capturing, through an audio detector positioned relative to an unloading bay at a shopping facility, audio signals generated at the unloading bay; receiving, over time through an audio evaluation circuit, the audio signals captured by the audio detector; and identifying, for each of the audio signals, when the audio signal includes one or more audio signatures corresponding to one or more distinct predefined audio signatures that correspond to movements of products relative to unloading products from a product delivery vehicle at the unloading bay; and estimating, through a control circuit, at a given time a state of unloading of a load of products intended for the shopping facility as a function of the identifying that one or more of the audio signals include one or more audio signatures corresponding to the one or more predefined audio signatures that correspond to movements of products relative to unloading.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system to monitor unloading of product delivery vehicles, comprising:
   an audio detector positioned relative to an unloading bay at a shopping facility and configured to capture audio signals generated at the unloading bay;
   an audio evaluation circuit configured to:
      receive, over time, the audio signals captured by the audio detector; and
      identify, for each of the audio signals, when the audio signal includes one or more audio signatures corresponding to one or more distinct predefined audio signatures that correspond to movements of products relative to unloading products from a product delivery vehicle at the unloading bay; and
   a control circuit coupled with the audio evaluation circuit and configured to estimate at a given time a state of unloading of a load of products intended for the shopping facility as a function of the identifying that one or more of the audio signals include one or more audio signatures corresponding to the one or more predefined audio signatures that correspond to movements of products relative to unloading.

2. The system of claim 1, wherein the control circuit is further configured to:
   identify that the estimated state of unloading of the load is greater than a threshold state; and
   notify one or more workers of the shopping facility to initiate the movement of one or more products unloaded from the product delivery vehicle to a sales floor of the shopping facility in response to the estimated state of unloading being determined to be greater than the threshold state.

3. The system of claim 2, wherein the audio evaluation circuit, in identifying that one or more of the audio signals include one or more audio signatures corresponding to one or more distinct predefined audio signatures, is further configured to identify that a first audio signature of a first audio signal corresponds to one or more products being placed in one of one or more staging areas;
   the control circuit is further configured to determine a location of the one of the one or more staging areas in which the one or more products were placed as a function of detecting the first audio signature; and
   wherein the control circuit, in notifying the one or more workers, is further configured to direct the one or more workers to the determined location.

4. The system of claim 1, wherein the audio evaluation circuit, in identifying when the audio signal includes one or more audio signatures corresponding to the one or more predefined audio signatures, is further configured to identify that each of a sequence of multiple audio signatures correspond to one or more predefined audio signatures corresponding to successive and progressive movements of a product transport apparatus being moved into the product delivery vehicle;

wherein the control circuit is configured to estimate a distance into the product delivery vehicle that the product transport apparatus has been moved as a function of the multiple audio signatures corresponding to the predefined audio signatures corresponding to the progressive movements of the product transport apparatus being moved into the product delivery vehicle; and wherein the control circuit in estimating the state of unloading is configured to estimate the state of unloading as a function of the estimated distance into the product delivery vehicle the product transport apparatus has been moved.

5. The system of claim 1, wherein the audio evaluation circuit, in identifying when the audio signal includes one or more audio signatures corresponding to the one or more predefined audio signatures, is further configured to identify that each of multiple sequences of audio signatures correspond to one or more sequences of predefined audio signatures corresponding to a product packaging being moved relative to a product transport apparatus as the product packaging is removed from the product delivery vehicle;

the control circuit is further configured to estimate a number of product packagings that have been removed from the product delivery vehicle as a function of a number of the multiple sequences of audio signatures that correspond to the one or more sequences of predefined audio signatures corresponding to a product packaging being moved relative to the product transport apparatus; and wherein the control circuit, in estimating the state of unloading, is configured to estimate the state of unloading as a function of the number of product packagings that have been removed from the product delivery vehicle.

6. The system of claim 1, wherein the control circuit is further configured to:

identify that a first audio signature detected in a first audio signal of the captured audio signals corresponds to a first predefined audio signature of a delivery door relative to the unloading bay being opened; and initiate a tracking of the unloading of the product delivery vehicle in response to the identifying that the first audio signature corresponds to the first predefined audio signature of the delivery door being opened.

7. The system of claim 6, wherein the control circuit is further configured to determine an efficiency of unloading based on a current time relative to a time of detecting the first audio signal containing the first audio signature corresponding to the first predefined audio signature of the delivery door being opened.

8. The system of claim 1, wherein the audio detector comprises a directional microphone mounted at a distance from the unloading bay and directed at the unloading bay to capture at least some of the audio signals generated relative to the delivery vehicle during unloading.

9. A method of monitor unloading of product delivery vehicles, comprising:

capturing, through an audio detector positioned relative to an unloading bay at a shopping facility, audio signals generated at the unloading bay;

receiving, over time through an audio evaluation circuit, the audio signals captured by the audio detector;

identifying, for each of the audio signals, when the audio signal includes one or more audio signatures corresponding to one or more distinct predefined audio signatures that correspond to movements of products relative to unloading products from a product delivery vehicle at the unloading bay; and estimating, through a control circuit, at a given time a state of unloading of a load of products intended for the shopping facility as a function of the identifying that one or more of the audio signals include one or more audio signatures corresponding to the one or more predefined audio signatures that correspond to movements of products relative to unloading.

10. The method of claim 9, the method further comprising:

identifying that the estimated state of unloading of the load is greater than a threshold state; and notifying one or more workers of the shopping facility to initiate the movement of one or more products unloaded from the product delivery vehicle to a sales floor of the shopping facility in response to the estimated state of unloading is greater than the threshold state.

11. The method of claim 10, wherein the identifying that one or more of the audio signals include one or more audio signatures corresponding to one or more distinct predefined audio signatures further comprises identifying that a first audio signature of a first audio signal corresponds to one or more products being placed in one of one or more staging areas; and determining a location of the one of the one or more staging areas in which the one or more products were placed as a function of detecting the first audio signature; and the notifying the one or more workers further comprises directing the one or more workers to the determined location.

12. The method of claim 9, wherein the identifying when the audio signal includes one or more audio signatures corresponding to the one or more predefined audio signatures further comprises identifying that each of a sequence of multiple audio signatures correspond to one or more predefined audio signatures corresponding to successive and progressive movements of a product transport apparatus being moved into the product delivery vehicle;

estimating a distance into the product delivery vehicle that the product transport apparatus has been moved as a function of the multiple audio signatures corresponding to the predefined audio signatures corresponding to the progressive movements of the product transport apparatus being moved into the product delivery vehicle; and wherein the estimating the state of unloading further comprises estimate the state of unloading as a function of the estimated distance into the product delivery vehicle the product transport apparatus has been moved.

13. The method of claim 9, wherein the identifying when the audio signal includes one or more audio signatures corresponding to the one or more predefined audio signatures further comprises identifying that each of multiple sequences of audio signatures correspond to one or more sequences of predefined audio signatures corresponding to a product packaging being moved relative to a product transport apparatus as the product packaging is removed from the product delivery vehicle;

estimating a number of product packagings that have been removed from the product delivery vehicle as a function of a number of the multiple sequences of audio signatures that correspond to the one or more sequences of predefined audio signatures corresponding to a product packaging being moved relative to the product transport apparatus; and wherein the estimating the state of unloading further comprises estimating the state of unloading as a function of the number of product packagings that have been removed from the product delivery vehicle.

14. The method of claim 9, further comprising:
identifying that a first audio signature detected in a first audio signal of the captured audio signals corresponds to a first predefined audio signature of a delivery door relative to the unloading bay being opened; and
initiating a tracking of the unloading of the product delivery vehicle in response to the identifying that the first audio signature corresponds to the first predefined audio signature of the delivery door being opened.

15. The method of claim 14, further comprising:
determining an efficiency of unloading based on a current time relative to a time of detecting the first audio signal containing the first audio signature corresponding to the first predefined audio signature of the delivery door being opened.

16. The method of claim 9, further comprising:
mounting a directional microphone at a distance from the unloading bay and directed at the unloading bay;
wherein the capturing the audio signals comprises capturing at least some of the audio signals generated relative to the delivery vehicle during unloading.

* * * * *